(12) United States Patent
Croteau et al.

(10) Patent No.: US 10,611,938 B2
(45) Date of Patent: Apr. 7, 2020

(54) OIL-ENHANCED POLYMER MODIFIED ASPHALT ADHESIVE COMPOSITIONS AND METHODS OF MAKING

(71) Applicant: Owens Corning Intellectual Capital, LLC, Toledo, OH (US)

(72) Inventors: Corey Richard Croteau, Exeter, NH (US); John Mathias Lackner, Jr., Bedford, NH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 102 days.

(21) Appl. No.: 14/827,381

(22) Filed: Aug. 17, 2015

(65) Prior Publication Data
US 2016/0053150 A1 Feb. 25, 2016

Related U.S. Application Data

(60) Provisional application No. 62/039,099, filed on Aug. 19, 2014.

(51) Int. Cl.
| | | |
|---|---|---|
| *C09J 195/00* | (2006.01) | |
| *B32B 5/16* | (2006.01) | |
| *B32B 5/22* | (2006.01) | |
| *C08K 3/013* | (2018.01) | |
| *C08K 5/12* | (2006.01) | |

(52) U.S. Cl.
CPC .............. *C09J 195/00* (2013.01); *B32B 5/16* (2013.01); *B32B 5/22* (2013.01); *B32B 2255/26* (2013.01); *B32B 2264/107* (2013.01); *B32B 2419/06* (2013.01); *C08K 3/013* (2018.01); *C08K 5/12* (2013.01)

(58) Field of Classification Search
CPC ........ C09J 195/00; C08K 3/0033; E04D 5/00; E04D 5/02; E04D 5/06; E04D 5/08; E04D 5/10; B32B 5/16; B32B 2264/107; B32B 5/22; B32B 2419/06; B32B 2255/26
See application file for complete search history.

(56) References Cited

U.S. PATENT DOCUMENTS 3,379,662 A * 4/1968 Bramble ................ C09J 195/00
106/164.6
3,770,559 A 11/1973 Jackson
(Continued)

OTHER PUBLICATIONS

Author Unknown, 2012, Pavement Interactive, Penetration Grading.*
(Continued)

*Primary Examiner* — Nathan L Van Sell
(74) *Attorney, Agent, or Firm* — Calfee, Halter & Griswold LLP

(57) ABSTRACT

Oil-enhanced polymer modified asphalt adhesive compositions, membrane materials including the oil-enhanced polymer modified asphalt adhesive composition, and methods for making are provided. The oil-enhanced polymer modified asphalt adhesive compositions have improved elongation, recovery, heat resistance, and cold adhesion and may include a polymer modified asphalt and an oil or oil derivative additive. The polymer modified asphalt may include an elastomeric copolymer. The oil or oil derivative additive may include one or more of vegetable oils, nut oils, and seed oils. A membrane including the oil-enhance polymer modified asphalt is also provided. A multi-layered roofing membrane is also provided.

28 Claims, 3 Drawing Sheets

(56) References Cited

U.S. PATENT DOCUMENTS

| | | | | |
|---|---|---|---|---|
| 4,091,135 | A * | 5/1978 | Tajima | B32B 37/24 |
| | | | | 428/131 |
| 4,738,884 | A | 4/1988 | Algrim et al. | |
| 4,778,852 | A * | 10/1988 | Futamura | C08L 23/16 |
| | | | | 524/505 |
| 4,994,508 | A * | 2/1991 | Shiraki | C08L 51/006 |
| | | | | 524/128 |
| 5,687,517 | A | 11/1997 | Wiercinski et al. | |
| 6,120,913 | A * | 9/2000 | Kluttz | B32B 11/10 |
| | | | | 428/521 |
| 6,531,200 | B2 | 3/2003 | Zickell et al. | |
| 6,696,125 | B2 | 2/2004 | Zanchetta et al. | |
| 7,132,143 | B2 | 11/2006 | Zanchetta et al. | |
| 7,475,519 | B2 | 1/2009 | Swann | |
| 7,550,187 | B2 | 6/2009 | Seth et al. | |
| 2003/0114623 | A1 * | 6/2003 | Mitani | C08F 10/00 |
| | | | | 526/352 |
| 2009/0124730 | A1 * | 5/2009 | Matsuda | C08C 19/02 |
| | | | | 524/71 |
| 2011/0052852 | A1 * | 3/2011 | Samanta | E04D 5/10 |
| | | | | 428/40.3 |
| 2012/0046395 | A1 * | 2/2012 | Gonzalez Leon | C04B 26/26 |
| | | | | 524/59 |
| 2013/0071299 | A1 * | 3/2013 | Hassan | A23D 9/00 |
| | | | | 422/224 |
| 2013/0295394 | A1 * | 11/2013 | Hong | C09D 195/00 |
| | | | | 428/440 |
| 2014/0014000 | A1 | 1/2014 | Franzen et al. | |

OTHER PUBLICATIONS

Tremco, Designing Tremco High Performance, Gold Applied Built-up Roofing Systems, 1 page brochure version 4.1-1, date is at least as early as the filing date of this application.

United Soybean Board, Market Opportunity Summary, Soy Products for Rubber Compounds, 2 page brochure, dated 2012.

Owens Corning, WeatherLock Mat, Self Sealing Ice & Water Barrier, 2 page brochure, dated Nov. 2010.

Owens Corning, WeatherLock G, Granulated Self-Sealing Ice & Water Barrier, 2 page brochure, dated Nov. 2010.

Owens Corning, WeatherLock Flex, Flexible Self-Sealing Ice & Water Barrier, 4 page brochure, dated Dec. 2009.

\* cited by examiner

OIL-ENHANCED POLYMER MODIFIED ASPHALT ADHESIVE COMPOSITIONS AND METHODS OF MAKING

RELATED APPLICATIONS

This application is related to and claims priority benefits from U.S. Provisional Patent Application Ser. No. 62/039,099, filed Aug. 19, 2014 entitled "Oil-Enhanced Polymer Modified Asphalt Adhesive Compositions and Methods of Making", the entire content of which is expressly incorporated herein by reference.

TECHNICAL FIELD

The present disclosure relates generally to asphalt adhesive materials, and more particularly, to methods and compositions for producing an oil-enhanced polymer modified asphalt adhesive composition.

BACKGROUND

Asphalt compositions suitable for use in weatherproofing applications are generally produced by selecting a suitable asphalt, or asphalt flux, and processing the asphalt to obtain particular, useful properties. For instance, it is important that the asphalt compositions retain some degree of hardness and do not flow under conditions of high temperature while still maintaining the ability to flex and recover under stress. Additives may be included in the asphalt composition to improve these properties.

SUMMARY

The present exemplary embodiments are directed to oil-enhanced asphalt adhesive compositions having improved elongation, recovery, heat resistance, cold adhesion, and/or shelf-life.

In some exemplary embodiments, an oil-enhanced polymer modified asphalt adhesive composition is provided. The adhesive composition comprises a polymer modified asphalt and an oil or oil derivative additive. The polymer modified asphalt may comprise an elastomeric copolymer. The oil or oil derivative additive may comprise one or more of vegetable oils, nut oils, and seed oils.

In some exemplary embodiments, a membrane material is provided that includes a carrier and an oil-enhanced polymer modified asphalt adhesive composition. The oil-enhanced polymer modified asphalt composition may comprise a polymer modified asphalt, wherein the polymer modified asphalt comprises an elastomeric copolymer, and an oil or oil derivative additive, wherein the oil comprises one or more of vegetable oils, nut oils, and seed oils.

In some exemplary embodiments, a multi-layered roofing membrane is provided. The membrane may comprise a surface coating layer, a first adhesive layer, a reinforcing layer, and an optional second adhesive layer. The first adhesive layer, the second adhesive layer, or both may comprise an oil-enhanced polymer modified asphalt adhesive composition. The oil-enhanced polymer modified asphalt adhesive composition may comprise a polymer modified asphalt and an oil or oil derivative additive. The polymer modified asphalt may comprise an elastomeric copolymer. The oil or oil derivative additive may comprise one or more of vegetable oils, nut oils, and seed oils.

In some exemplary embodiments, a method for producing an oil-enhanced polymer modified asphalt adhesive composition is provided. The method comprises heating asphalt to produce a molten asphalt material and incorporating an additive into the molten asphalt material, forming an oil-enhanced asphalt. The additive may comprise at least one oil or oil derivative, wherein the oil comprises one or more of vegetable oils, nut oils, and seed oils. The method further comprises incorporating a polymer modifier into the oil-enhanced asphalt composition and incorporating at least one filler.

Additional features and advantages will be set forth in part in the description that follows, and in part may be apparent from the description, or may be learned by practice of the exemplary embodiments disclosed herein. The objects and advantages of the exemplary embodiments disclosed herein will be realized and attained by means of the elements and combinations particularly pointed out in the appended claims. It is to be understood that both the foregoing summary and the following detailed description are exemplary and explanatory only and are not restrictive of the general inventive concepts as disclosed herein or as otherwise claimed.

DESCRIPTION OF THE DRAWINGS

Exemplary embodiments of the disclosure will be apparent from the more particular description of certain example embodiments provided below and as illustrated in the accompanying drawings.

DETAILED DESCRIPTION

Figure 1:
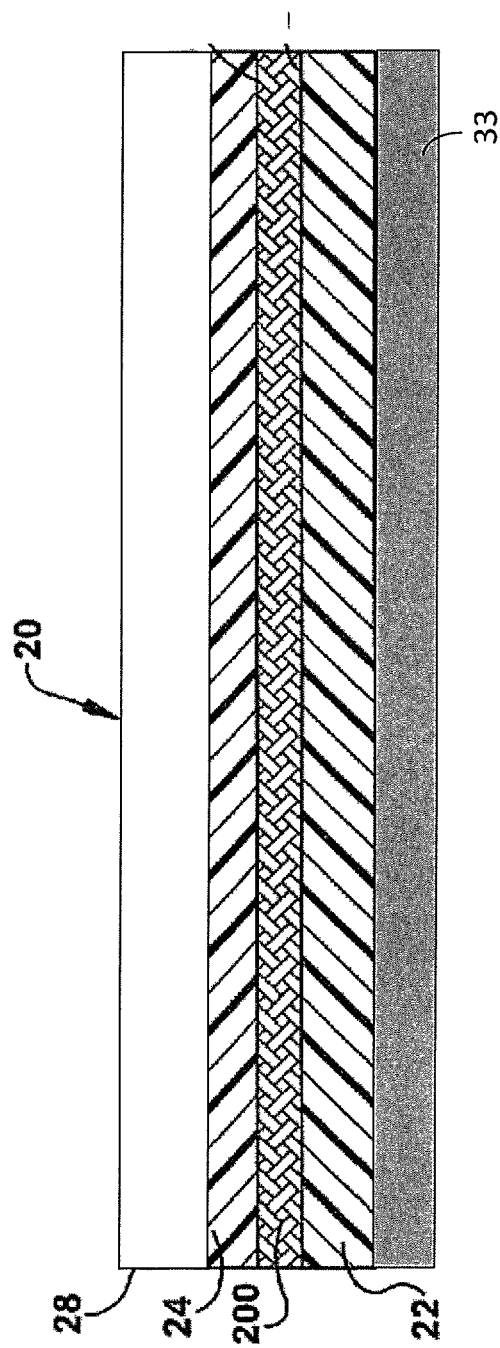
FIG. 1 is a cross-sectional view of a membrane having an oil-enhanced polymer modified asphalt adhesive composition disposed thereon.

Unless otherwise defined, all technical and scientific terms used herein have the same meaning as commonly understood by one of ordinary skill in the art to which these exemplary embodiments belong. The terminology used in the description herein is for describing particular exemplary embodiments only and is not intended to be limiting of the exemplary embodiments.

As used in the specification and the appended claims, the singular forms "a," "an," and "the" are intended to include the plural forms as well, unless the context clearly indicates otherwise. All publications, patent applications, patents, and other references mentioned herein are incorporated by reference in their entirety.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present exemplary embodiments. At the very least, and not as an attempt to limit the application of the doctrine of equivalents to the scope of the claims, each numerical parameter should be construed in light of the number of significant digits and ordinary rounding approaches.

Notwithstanding that the numerical ranges and parameters setting forth the broad scope of the exemplary embodiments are approximations, the numerical values set forth in the specific examples are reported as precisely as possible. Any numerical value, however, inherently contains certain errors necessarily resulting from the standard deviation found in their respective testing measurements. Every numerical range given throughout this specification and claims will include every narrower numerical range that falls within such broader numerical range, as if such narrower numerical ranges were all expressly written herein.

The general inventive concepts are directed to oil-enhanced polymer modified asphalt adhesive compositions for use in membrane-based applications. In some exemplary embodiments, the oil-enhanced polymer modified asphalt adhesive comprises polymer modified asphalt that has been further modified with the addition of an oil, such as vegetable oil, nut oil, or seed oil. In some exemplary embodiments, the oil-enhanced polymer modified asphalt adhesive comprises asphalt that has been modified with the addition of an oil, such as vegetable oil, nut oil, or seed oil, and then has been further modified with the addition of a polymer modifier.

Exemplary membrane-based applications include, but are not limited to, roofing applications, road repair and/or paving applications, air barrier applications, tapes (e.g. for sealing windows or doors, or for use in gutters or decks); and below grade membranes, such as those applied to foundation walls, tunnels, earth shelters, structural concrete decks, plaza decks, parking decks, insulating foams, and above or below grade split slab construction. Exemplary membrane-based roofing applications may include low slope roofing; steep slope roofing; and underlayment. The underlayment may be reinforced (with a glass or polyester woven or nonwoven) or non-reinforced, and may have a smooth, granular (such as coal slag, sand, or roofing granules), film (such as a polyolefin or polyester), or woven or nonwoven (such as glass, polyolefin or polyester) surface.

In some exemplary embodiments, the oil-enhanced polymer modified asphalt adhesive is used to produce a membrane. The membrane may comprise a substrate that is impregnated with, or includes a coating of the oil-enhanced polymer modified asphalt adhesive composition.

In some exemplary embodiments, the oil-enhanced polymer modified asphalt adhesive may comprise one or more polymer modifiers. The polymer modifier may comprise any suitable polymer. In some exemplary embodiments, the polymer modifier comprises an elastomeric radial or linear polymer. In some exemplary embodiments, the polymer modifier comprises a copolymer such as a linear or radial copolymer. In some exemplary embodiments, the polymer modifier comprises one or more of styrene-butadiene-styrene (SBS), styrene-butadiene rubber (SBR), styrene-isoprene-styrene (SIS), and thermoplastic polyolefin (TPO). In other exemplary embodiments, the polymer modifier comprises a linear polymer or a combination of linear and radial polymers. Examples of polymer modifiers are disclosed in U.S. Pat. Nos. 4,738,884 to Algrim et al. and U.S. Pat. No. 3,770,559, to Jackson, the contents of which are incorporated herein by reference in their entirety.

The asphalt used in the present composition may include various types or grades of asphalt, including flux, paving grade asphalt blends, propane washed asphalt, oxidized asphalts, and/or blends thereof. Effective blends of asphalt or bituminous materials are understood by those of ordinary skill in the art. The asphalt may also include one or more fillers, such as a filler of finely ground inorganic particulate matter, such as ground limestone, dolomite or silica, talc, sand, or calcium carbonate.

Other materials suitable for use in the asphalt composition include tackifying resins and other types of natural and synthetic rubber materials and thermoplastic polymers. Additionally, recycled roof tear-off materials, such as shingles, may be included in the asphalt adhesive. Recycled shingles may be processed in a wide variety of different ways to allow the material to be used in the adhesive. For example, tear off shingles may be processed as described in U.S. Patent Application No. 2014/0014000, the contents of which are incorporated herein by reference in its entirety, to be used as filler or an additive to the asphalt.

In some exemplary embodiments, the asphalt is enhanced with an oil or oil derivative additive, forming an oil-enhanced asphalt composition. In some exemplary embodiments, the oil may comprise one or more vegetable oils, nut oils, or seed oils, of any variety known and generally available in the art such as, for example, soy oil, canola oil, corn oil, peanut oil, sunflower oil, olive oil, safflower oil, rapeseed oil, or mixtures thereof. In some exemplary embodiments, the oil additive is a soy-based vegetable oil. In some exemplary embodiments, the oil has been modified by hydrogenation or oxidation.

The resulting oil-enhanced polymer modified asphalt adhesive may comprise about 25 to about 70 weight percent asphalt, about 25 percent to about 60 percent by weight of a filler material, about 1 to about 10 weight percent of a polymer modifier, and 1.0 to about 8.0 weight percent oil or oil derivative additive, based on the total weight of the oil-enhanced polymer modified asphalt adhesive. In some exemplary embodiments, the oil-enhanced polymer modified asphalt adhesive comprises about 40 to about 55 weight percent asphalt, about 35 percent to about 50 percent by weight of a filler material, about 2 to about 4 weight percent polymer modifier, and about 2.0 to about 4.0 weight percent oil or oil derivative additive, based on the total weight of the oil-enhanced polymer modified asphalt adhesive.

In some exemplary embodiments, the oil-enhanced polymer modified asphalt material is used in the formation of a membrane or laminate for various applications, such as roofing applications, road applications, and the like. In some exemplary embodiments, the membrane material comprises a substrate that has been coated and/or impregnated with an oil-enhanced polymer modified asphalt adhesive composition. Thus, the oil-enhanced polymer modified asphalt adhesive composition serves as the membrane matrix, or substantially continuous phase, in which the substrate is located for strength purposes, and onto at least one side of which is a coating of the oil-enhanced polymer modified asphalt adhesive composition, which serves to enhance the membrane bonding to a desired surface. In some exemplary embodiments, the membrane will be sufficiently flexible to allow it to be formed into rolls in order to protect the adhesive layer. To prevent membrane adherence in the rolled form prior to the time of use, the adhesive layer may be covered with a suitable removable or releasable skin, such as in the form of a tear-away liner.

Referring now to FIG. 1, some embodiments of the membrane 20 may comprise a plurality of layers. The layers may include a base release liner 33 which may comprise a siliconized polyolefin film. Disposed atop the base release liner 33 may be a first adhesive layer 22 of oil-enhanced polymer modified asphalt adhesive as disclosed herein. A reinforcing layer 200 may be disposed atop the first adhesive layer 22. A second adhesive layer 24 may be disposed atop the reinforcing layer 200. The second adhesive layer 24 may comprise the same composition as the first adhesive layer 22 or it may be of a different composition. The second adhesive layer 24 may comprise a polymer modified adhesive or may comprise an oil-enhanced polymer modified asphalt adhesive as disclosed herein. Disposed atop the second adhesive layer 24 may be a surface layer 28. The surface layer 28 may comprise granules, which may comprise gravel, sand, or coal-slag; a film, which may comprise a polyolefin or acrylic; or a fabric, which may be woven or non-woven, and which may comprise a polyolefin or a polyester In some exemplary embodiments, the reinforcing layer 200 may be a fibrous reinforcement layer, such as chopped strand mats, continuous strand mats, swirl mats, woven and non-woven fabrics, e.g., woven rovings, insect screening, scrim and the like. In some exemplary embodiments, the fibrous materials are glass but they may also be organic polymeric materials or combinations of glass and organic polymers. The reinforcing layer 200 may be impregnated with asphalt, with the asphalt being either polymer modified asphalt or oil-enhanced polymer modified asphalt.

Figure 2:
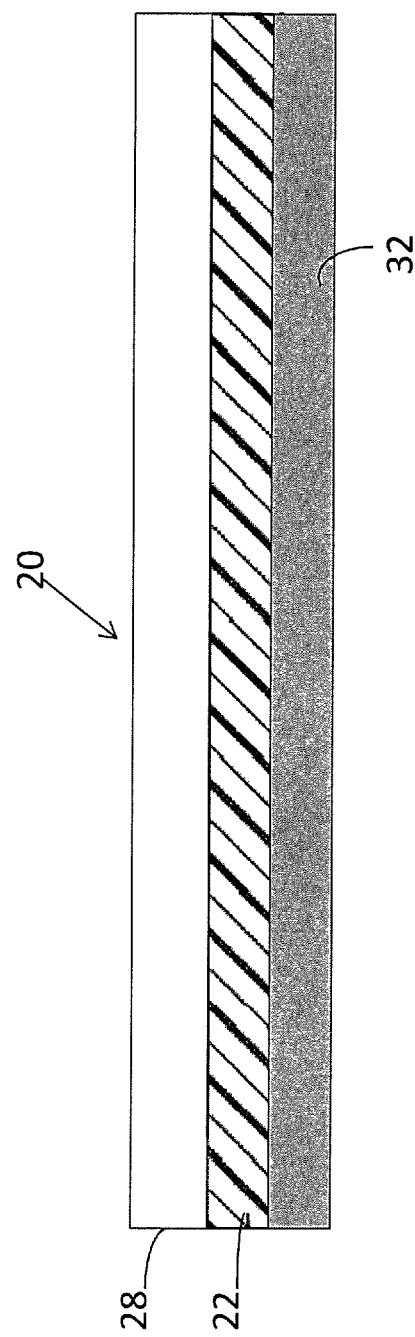
FIG. 2 is a cross-sectional view of an exemplary embodiment of a membrane having an oil-enhanced polymer modified asphalt adhesive composition disposed thereon.

Preparation of membrane 20 may include a carrier layer 32 (FIG. 2) to pull the oil-enhanced polymer modified asphalt through the manufacturing process. In the case where reinforcing layer 200 is present, this reinforcing layer 200 may become that carrier, making carrier layer 32 optional. As illustrated in FIG. 2, the membrane 20 may be formed excluding reinforcing layer 200. In that case, a carrier layer 32, such as release liner 32, may be used as the carrier to pull the oil-enhanced polymer modified asphalt through the process. In addition, layer 24 may not be present and the construction simplifies to a 3-layer system.

Figure 3:
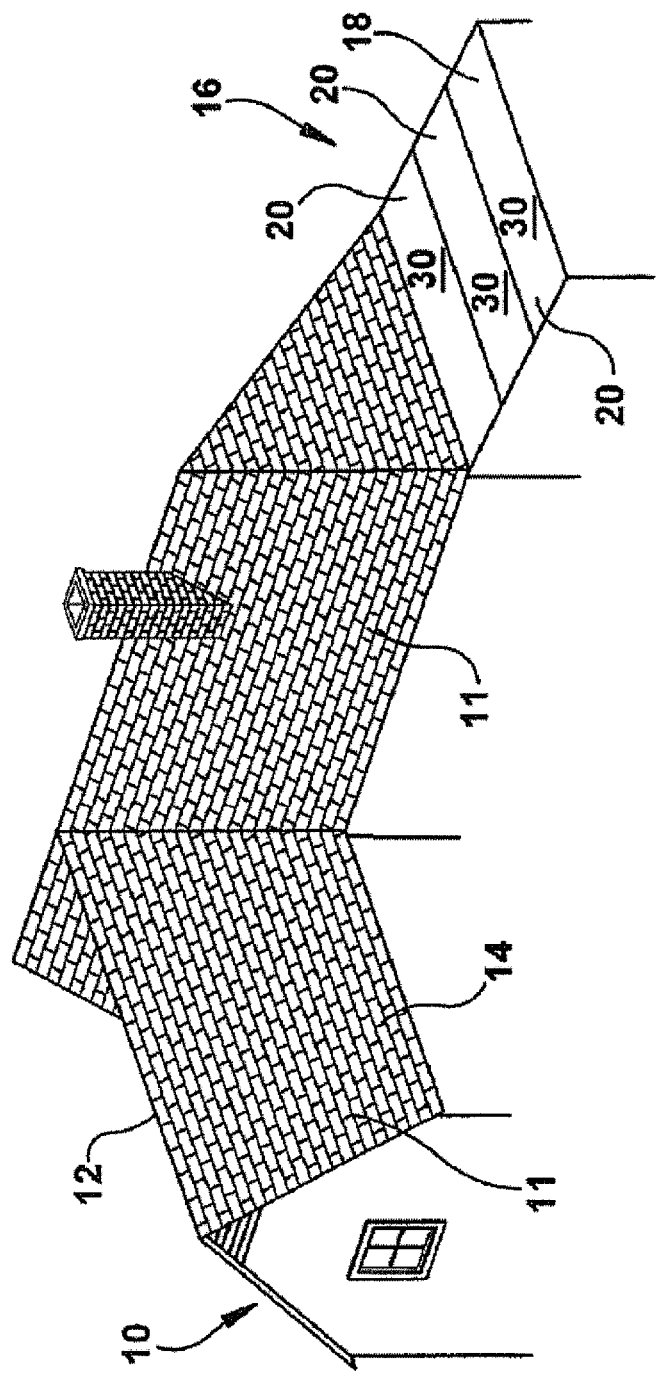
FIG. 3 is a perspective view of a building structure comprising a shingle-based roofing system.

The carrier layer 22 may take a wide variety of different forms. The carrier layer 32 can be any material that removably adheres to the roofing membrane. Examples of acceptable materials for the carrier layer 32 include, but are not limited to, plastic materials, such as plastic films (i.e. polyolefin film, etc.), coated materials, such as paper, plastic or other material coated with silicone or other release material. The carrier layer 32 prevents the membrane 20 from adhering to itself when arranged in a roll, as described below or when sheets of the granule coated roofing membrane 20 are stacked. The carrier layer 32 may be removed by a roof installer so that the bottom surface, or surface opposite the coated surface 28 of the membrane 20, will adhere to a low-slope roof deck 18, steep-slope roof, or other base roof material, as shown in FIG. 3.

In some exemplary embodiments, one or more of the first and second asphalt adhesive layers 22, 24 comprise polymer modified asphalt. The polymer modified asphalt may be modified by any suitable polymer. Some exemplary embodiments of the polymer modified asphalt material comprise an elastomeric copolymer such as a block radial copolymer. In some exemplary embodiments, the polymer modified asphalt material comprises one or more of styrene-butadiene-styrene (SBS), styrene-isoprene-styrene (SIS), and thermoplastic polyolefin (TPO). In other exemplary embodiments, the polymer modified asphalt may be modified by a linear polymer or a combination of a linear and radial polymer.

In some exemplary embodiments, the membrane 20 is a water resistant membrane.

In some exemplary embodiments, the oil-enhanced polymer modified asphalt adhesive composition is used in the formation of a roofing membrane used in roofing applications, such as low-slope, steep-slope, and flat roofs. As used in this application, the phrase "low-slope roof" is defined as a roof having a slope or pitch less than 4:12. Typical low slope roofs have a slope greater than about ¼:12 and less than 4:12. Proper roof design requires some slope to promote drainage and prevent water ponding. As used in this application, the phrase "steep-slope roof" is defined as a roof having a slope or pitch greater than 4:12. Typical steep-slope roofs have a slope or pitch greater than 4:12 and less than about 18:12, however, some steep-slope roofs may be even steeper. Details of typical steep-slope roofs can be found in the Asphalt Roofing Residential Manual, 2006, published by The Asphalt Roofing Manufacturers Association (ARMA). Unless otherwise indicated, the roofing membranes described herein can be used in any of low-slope, steep-slope, and flat roof applications.

Referring now to FIG. 3, a building structure 10 is shown having a steep roof 11 with a shingle-based roofing system 12. While the building structure 10 illustrated in FIG. 3 is a residential home, it will be understood that the building structure 10 may be any type of structure, such as any residential, industrial, or commercial building. In the exemplary embodiment of FIG. 3, a low-slope roof 16 extends from the building structure 10 and may cover an open or enclosed patio, garage, or carport, for example. The low-slope roof 16 includes a low-slope roof deck 18.

When the membrane 20 is a traditional shingle, a layer of small particles, such as sand, is adhered to the first adhesive layer 22. This is referred to as backdusting. The backdusting prevents the shingle from sticking to other shingles when packaged. When the membrane 20 is a self-adhering roof covering, the first adhesive layer 22 adheres the reinforcement layer to the roof or an optional release layer 32 or underlayment. The surface 28 is adhered to the reinforcement layer 200 by the second adhesive layer 24.

The second adhesive layer 24, if present, may be identical to the first adhesive layer 22 or the adhesive layers may comprise different compositions. In some exemplary embodiments, the second adhesive layer 24 comprises a core batch layer, comprising unmodified asphalt, and the first adhesive layer comprises the oil-enhanced polymer modified asphalt adhesive compositions disclosed herein. In other exemplary embodiments, both the first and second adhesive layers 22, 24 comprise the oil-enhanced polymer modified asphalt adhesive compositions disclosed herein.

The surface coating 28, asphalt adhesive layers 22, 24, reinforcement layers 200, and/or release/underlayment layers disclosed herein can be combined in a variety of different ways to construct many different membranes 20.

The oil-enhanced polymer modified asphalt adhesive disclosed herein may be produced by any method of forming an asphalt adhesive commonly known and used in the art. In some exemplary embodiments, the method comprises heating asphalt in the presence of an oil or oil derivative additive, to produce a molten oil-enhanced asphalt material. A polymer modifier, as described above, may then be mixed into the molten asphalt material, forming an oil-enhanced polymer modified asphalt adhesive composition comprising any of the embodiments described or otherwise suggested herein.

In other exemplary embodiments, the asphalt may first be modified by a polymer modifier, forming a polymer-modified asphalt. An oil or oil derivative, as described above, may then be mixed into the polymer-modified asphalt.

In some exemplary embodiments, the oil-enhanced polymer modified asphalt adhesive is prepared by the following method. The necessary amount of asphalt and oil (amounts vary by type of oil) are mixed together under a high shear mixer (an example of which includes a Silverson Lab mixer) over heat. Once a temperature of 320° F. is reached, the polymer is slowly added. The mixture is maintained at a temperature between 350 and 385° F. while mixing under the high shear mixer for one hour at 4000 RPM. The filler is then added and mixed for an additional 30 minutes under the high shear mixer and then, finally, mixed by hand using a stirring tool. The mixture is then allowed to cool to 310° F. or less.

All combinations of method or process steps as used herein can be performed in any order, unless otherwise specified or clearly implied to the contrary by the context in which the referenced combination is made.

In some exemplary embodiments, the oil-enhanced polymer modified asphalt adhesive compositions disclosed herein exhibit improved properties, such as improved cold adhesion (both long and short term), elongation to break, recovery, tensile strength, and/or shelf-life. Elongation is the measure of ductility of a material and is measured by the ratio of change in axial length to the original length of the material. More flexible materials have a much higher elongation than that of a rigid material. Ductility is a material's ability to deform under tensile stress and is the maximum stress that a material can withstand while being stretched or pulled before failing or breaking.

Tables 1-21 illustrate exemplary oil-enhanced polymer modified asphalt adhesive compositions compared to either non-oil modified asphalt compositions or asphalt compositions modified by a non-vegetable or soy oil. For each of the compositions shown, the composition may comprise from 40-55% asphalt flux, 1-4% radial polymer, and 25-60% fillers. The compositions having oil-enhanced polymer modified asphalt adhesive compositions as disclosed herein, include up to about 4% of one or more vegetable oils, such as soy oil, canola oil, corn oil, peanut oil, sunflower oil, olive oil, safflower oil, rapeseed oil, and mixtures thereof, although the examples are not meant to be limiting to the amount of oil that may be included. For comparative purposes, the compositions not having oil-enhanced polymer modified asphalt adhesive compositions as disclosed herein may comprise up to 4% of a standard petroleum oil, such as a heavy paraffinic or napthenic oil such as Hydrolene SP125.

In some exemplary embodiments, the oil-enhanced polymer modified asphalt adhesive compositions disclosed herein have a tensile strength of from about 1 to about 23 pounds. In other exemplary embodiments, the oil-enhanced polymer modified asphalt adhesive compositions disclosed herein have a tensile strength from about 3 to about 21 pounds. In other exemplary embodiments, the oil-enhanced polymer modified asphalt adhesive compositions disclosed herein have a tensile strength from about 5 to about 19 pounds.

In some exemplary embodiments, the oil-enhanced polymer modified asphalt adhesive composition disclosed herein has an elongation to break of at least about 10%. In other embodiments, the oil-enhanced polymer modified asphalt adhesive composition has an elongation to break of at least 25%. In some exemplary embodiments, the oil-enhanced polymer modified adhesive composition has a manual elongation to break of from about 8.5 inches to about 82 inches and a machine elongation to break of from about 0.1 inch to about 16.5 inches. In other exemplary embodiments, the oil-enhanced polymer modified adhesive composition has a manual elongation to break of from about 10.5 inches to about 80 inches and a machine elongation to break of from about 0.5 inches to about 13.5 inches. In other exemplary embodiments, the oil-enhanced polymer modified adhesive composition has a manual elongation to break of from about 12.5 inches to about 79 inches and a machine elongation to break of from about 1 inch to about 12.5 inches.

In some exemplary embodiments, the oil-enhanced polymer modified asphalt adhesive compositions disclosed herein have an adhesive level at a temperature of 40° F. of from about 0.05 to about 23 lbs/1" width. In some exemplary embodiments, the oil-enhanced polymer modified asphalt adhesive compositions disclosed herein have an adhesive level at a temperature of 40° F. of from about 0.1 to about 21 lbs/1" width. In some exemplary embodiments, the oil-enhanced polymer modified asphalt adhesive compositions disclosed herein have an adhesive level at a temperature of 40° F. of from about 0.5 to about 20 lbs/1" width.

In some exemplary embodiments, the adhesive level at a temperature of 40° F. remains at from about 0.5 to about 20 lbs/1" width after five weeks of aging. In some exemplary embodiments, the adhesive level at a temperature of 40° F. increases after five weeks of aging. In comparison, non-oil modified adhesives have a shorter shelf-life and may lose from 70%-98% adhesive level at a temperature of 40° F. after five weeks of aging at 105° F.

In some exemplary embodiments, the oil-enhanced polymer modified asphalt adhesive compositions have a softening point of at least 150° F. In some embodiments, the oil-enhanced polymer modified adhesive composition has a softening point of from about 155° F. to about 283° F. In some embodiments, the oil-enhanced polymer modified adhesive composition has a softening point of from about 158° F. to about 280° F.

In some exemplary embodiments, the oil-enhanced polymer modified asphalt adhesive compositions have a penetration of at least 35 pen units with a 100 gram weight. In some embodiments, the oil-enhanced polymer modified adhesive composition has a penetration of from about 40 to about 150 pen units with a 100 gram weight. In some embodiments, the oil-enhanced polymer modified adhesive composition has a penetration of from about 45 to about 145 pen units with a 100 gram weight.

In some exemplary embodiments, the oil-enhanced polymer modified asphalt adhesive compositions have a viscosity of at least 600 cps. In some exemplary embodiments, the oil-enhanced polymer modified asphalt adhesive compositions have a viscosity of from about 650 to about 80,000 cps. In some exemplary embodiments, the oil-enhanced polymer modified asphalt adhesive compositions have a viscosity of from about 700 to about 79,000 cps, or from about 800 to about 77,000 cps.

In some exemplary embodiments, the oil-enhanced polymer modified asphalt adhesive compositions have recovery when stretched to 12" for 2 minutes of 70%-100% of its original size. In some exemplary embodiments, the oil-enhanced polymer modified asphalt adhesive compositions have recovery when stretched to 12" for 2 minutes of 72%-99%, or from about 73% to about 98% of its original size.

EXAMPLES

The following examples further describe and demonstrate embodiments within the scope of the present disclosure. The examples are given solely for the purpose of illustration and are not to be construed as limitations of the present disclosure, as many variations thereof are possible without departing from the spirit and scope of the disclosure.

Table 1 illustrates various exemplary embodiments of the oil-enhanced polymer modified asphalt adhesive composition, in accordance with the present disclosure. Compositions a1-e1 illustrate examples of oil-enhanced polymer modified asphalt, as contemplated in the present disclosure. Specifically, compositions a1-e1 comprise polymer-modified asphalt, further modified with 1.0-4.0 weight percent of a food grade soy oil additive. Comparative asphalt compositions A1-E1 comprise polymer modified asphalt compositions that have been modified using petroleum oil, specifically Hydrolene SP 125 standard oil, rather than a soy oil additive. The softening point, penetration, viscosity, adhesive level at a temperature of 40° F. before and after 5 weeks of aging, manual and machine elongation, tensile strength, and recovery of the various compositions are illustrated in Tables 2-3. The properties were measured as follows: softening point by ASTM D36 using the ring-and-ball apparatus immersed in distilled water of 30-80° C.; penetration by ASTM D5 run at 25° C. with a 100 gram weight; viscosity by ASTM D4402 run at 400° F. (204° C.) with a Brookfield Viscometer, using a no. 27 spindle at 315° F.

Table 4 illustrates various exemplary embodiments of the oil-enhanced polymer modified asphalt adhesive composition, in accordance with the present disclosure. Compositions a2-d2 illustrate examples of oil-enhanced polymer modified asphalt, as contemplated in the present disclosure. Specifically, compositions a2-d2 comprise polymer-modified asphalt, further modified with 1.0-4.0 weight % of a food grade sunflower oil additive. Comparative asphalt compositions A2-D2 comprise polymer modified asphalt compositions that have been modified using petroleum oil, specifically Hydrolene SP 125 standard oil, rather than a sunflower oil additive. The softening point, penetration, viscosity, adhesive level at a temperature of 40° F. before and after 5 weeks of aging, manual and machine elongation, tensile strength, and recovery of the various compositions are illustrated in Tables 5-6. The properties were measured as follows: softening point by ASTM D36 using the ring-and-ball apparatus immersed in distilled water of 30-80° C.; penetration by ASTM D5 run at 25° C. with a 100 gram weight; viscosity by ASTM D4402 run at 400° F. (204° C.) with a Brookfield Viscometer, using a no. 27 spindle, 12-30 RPM at 315° F.

TABLE 1

Soy Oil-Enhanced polymer modified Asphalt Adhesives vs. Standard Oil.

|  | Asphalt Flux | Soy Oil | Hydrocarbon Oil | SBS Rubber | Filler |
|---|---|---|---|---|---|
| Compound A1 | 55% | 0 | 4% | 4% | 37% |
| Compound a1 | 55% | 4% | 0 | 4% | 37% |
| Compound B1 | 55% | 0 | 4% | 4% | 37% |
| Compound b1 | 55% | 4% | 0 | 4% | 37% |
| Compound C1 | 55% | 0 | 1% | 2% | 42% |
| Compound c1 | 55% | 1% | 0 | 2% | 42% |
| Compound D1 | 42% | 0 | 4% | 4% | 50% |
| Compound d1 | 42% | 4% | 0 | 4% | 50% |
| Compound E1 | 53% | 0 | 2% | 3% | 42% |
| Compound e1 | 53% | 2% | 0 | 3% | 42% |

TABLE 2

Properties for Soy Oil-Enhanced Polymer Modified Asphalt Adhesives vs. Standard Oil.

|  | Softening Point (F.) | Viscosity | Needle Pen (Wt: 100 Grams) | Recovery/Recoil Test (3) |
|---|---|---|---|---|
| Compound A1 | 244 | 6292 | 81 | 93.75 |
| Compound a1 | 242 | 3467 | 101 | 98.44 |
| Compound B1 | 250 | 7617 | 83 | 89.63 |
| Compound b1 | 244 | 3833 | 97 | 98.44 |
| Compound C1 | 220 | 3150 | 51 | 68.75 |
| Compound c1 | 220 | 2225 | 84 | 76.56 |
| Compound D1 | 273 | 50750 | 53 | 84.38 |
| Compound d1 | 265 | 19188 | 75 | 98.75 |
| Compound E1 | 247 | 15292 | 53 | 76.56 |
| Compound e1 | 245 | 6158 | 70 | 89.63 |

TABLE 4

Sunflower Oil-Enhanced Polymer Modified Asphalt Adhesives vs. Standard Oil.

|  | Asphalt Flux | Sunflower Oil | Hydrocarbon Oil | SBS Rubber | Filler |
|---|---|---|---|---|---|
| Compound A2 | 45% | 0 | 1% | 4% | 50% |
| Compound a2 | 45% | 1% | 0 | 4% | 50% |
| Compound B2 | 55% | 0 | 1% | 2% | 42% |
| Compound b2 | 55% | 1% | 0 | 2% | 42% |
| Compound C2 | 42% | 0 | 4% | 4% | 50% |
| Compound c2 | 42% | 4% | 0 | 4% | 50% |
| Compound D2 | 53% | 0 | 2% | 3% | 42% |
| Compound d2 | 53% | 2% | 0 | 3% | 42% |

TABLE 5

Properties for Sunflower Oil-Enhanced Polymer Modified Asphalt Adhesives vs. Standard Oil.

|  | Softening Point (F.) | Viscosity | Needle Pen |
|---|---|---|---|
| Compound A2 | 271 | 75500 | 51 |
| Compound a2 | 270 | 39917 | 59 |

TABLE 3

Properties for Soy Oil-Enhanced Polymer Modified Asphalt Adhesives vs. Standard Oil. (Continued)

|  | 40 F. Adhesion to Plywood (lbs per 1" width) | Adhesion to Plywood (lbs per 1" Width) After Aging (1) | Manual Elongation (6" × 1") Length Before Break/Inches | Tensile (2" × 1") Jaws Together (LBS) | Elongation from Tensile Machine (Inches) (2) |
|---|---|---|---|---|---|
| Compound A1 | 5.23 | 5.24 | 60.75 | 10 | 4.375 |
| Compound a1 | 6.46 | 15.162 | 65.125 | 13 | 6.125 |
| Compound B1 | 6.42 | — | 42.5 | 6.5 | 4.75 |
| Compound b1 | 10.46 | 12.88 | 64.5 | 11 | 5.25 |
| Compound C1 | 2.11 | 0 | 22 | 11 | 3 |
| Compound c1 | 4.68 | 4.16 | 28.875 | 13 | 6.5 |
| Compound D1 | 4.08 | — | 49 | 7 | 5.25 |
| Compound d1 | 5.52 | 6.97 | 58 | 9 | 6.5 |
| Compound E1 | 3.15 | 0.046 | 31.5 | 9 | 3.125 |
| Compound e1 | 6.59 | 5.38 | 65 | 15 | 5.375 |

(1) 5 Weeks Aging at 105 F./40 F. Adhesion to Plywood (lbs per 1" Width)
(2) Elongation from Tensile Machine (2" × 1")Jaws Together/Length Before Break (Inches)
(3) Recovery/Recoil Test/4" × 1" Sample/Stretched to 12"/Timed for 2 minutes/Measured % of recovery to original size TABLE 5-continued Properties for Sunflower Oil-Enhanced Polymer
Modified Asphalt Adhesives vs. Standard Oil.

| | Softening Point (F.) | Viscosity | Needle Pen |
|---|---|---|---|
| Compound B2 | 220 | 3150 | 51 |
| Compound b2 | 212 | 1900 | 82 |
| Compound C2 | 273 | 50750 | 53 |
| Compound c2 | 267 | 23708 | 75 |
| Compound D2 | 247 | 15292 | 53 |
| Compound d2 | 245 | 4500 | 82 |

TABLE 6

Properties for Sunflower Oil-Enhanced Polymer Modified
Asphalt Adhesives vs. Standard Oil. (Continued).

| | Manual Elongation (6" × 1") Length Before Break/Inches | Elongation from Tensile Machine (Inches)(2) | Recovery/Recoil Test (3) |
|---|---|---|---|
| Compound A2 | 43.375 | 7.375 | 82.8125 |
| Compound a2 | 46.625 | 10.375 | 87.5 |
| Compound B2 | 22 | 3 | 68.75 |
| Compound b2 | 39.75 | 4.875 | 93.75 |
| Compound C2 | 49 | 6.5 | 84.375 |
| Compound c2 | 62.125 | 7.875 | 93.75 |
| Compound D2 | 31.5 | 3.125 | 76.5625 |
| Compound d2 | 56.5 | 5.25 | 89.0625 |

(1) 5 Weeks Aging at 105 F./40 F. Adhesion to Plywood (lbs per 1" Width)
(2) Elongation from Tensile Machine (2" × 1")Jaws Together/Length Before Break (Inches)
(3) Recovery/Recoil Test/4" × 1" Sample/Stretched to 12"/Timed for 2 minutes/Measured % of recovery to original size Table 7 illustrates various exemplary embodiments of the oil-enhanced polymer modified asphalt adhesive composition, in accordance with the present disclosure. Compositions a3-c3 illustrate examples of oil-enhanced polymer modified asphalt, as contemplated in the present disclosure. Specifically, compositions a3-c3 comprise polymer-modified asphalt, further modified with 1.0-4.0 weight % of a food grade vegetable oil additive. Comparative asphalt compositions A3-C3 comprise polymer modified asphalt compositions that have been modified using petroleum oil, specifically Hydrolene SP 125 standard oil, rather than a vegetable oil additive. The softening point, penetration, viscosity, adhesive level at a temperature of 40° F. before and after 5 weeks of aging, manual and machine elongation, tensile strength, and recovery of the various compositions are illustrated in Tables 8-9. The properties were measured as follows: softening point by ASTM D36 using the ring-and-ball apparatus immersed in distilled water of 30-80° C.; penetration by ASTM D5 run at 25° C. with a 100 gram weight; viscosity by ASTM D4402 run at 400° F. (204° C.) with a Brookfield Viscometer, using a no. 27 spindle, 12-30 RPM at 315° F.

TABLE 7

Vegetable Oil-Enhanced Polymer Modified Asphalt
Adhesives vs. Standard Oil.

| | Asphalt Flux | Veg. Oil | Hydrocarbon Oil | SBS Rubber | Filler |
|---|---|---|---|---|---|
| Compound A3 | 55% | 0 | 1% | 2% | 42% |
| Compound a3 | 55% | 1% | 0 | 2% | 42% |
| Compound B3 | 44% | 0 | 4% | 2% | 50% |
| Compound b3 | 44% | 4% | 0 | 2% | 50% |
| Compound C3 | 55% | 0 | 4% | 4% | 37% |
| Compound c3 | 55% | 4% | 0 | 4% | 37% |

TABLE 8

Properties for Vegetable Oil-Enhanced Polymer Modified
Asphalt Adhesives vs. Standard Oil.

| | Softening Point (F.) | Viscosity | Needle Pen |
|---|---|---|---|
| Compound A3 | 214 | 2067 | 69 |
| Compound a3 | 161 | 1058 | 60 |
| Compound B3 | 230 | 3825 | 78 |
| Compound b3 | 225 | 2417 | 98 |
| Compound C3 | 250 | 7617 | 83 |
| Compound c3 | 234 | 11562 | 65 |

TABLE 9

Properties for Vegetable Oil-Enhanced Polymer Modified Asphalt Adhesives vs.
Standard Oil. (Continued)

| | 40 F. Adhesion to Plywood (lbs per 1" width) | Adhesion to Plywood (lbs per 1" Width) After Aging (1) | Manual Elongation (6" × 1") Length Before Break/Inches | Tensile (2" × 1") Jaws Together/ (LBS) | Recovery/Recoil Test (3) |
|---|---|---|---|---|---|
| Compound A3 | 1.08 | 0.574 | 36 | 2.625 | 71.875 |
| Compound a3 | 3.01 | 3.83 | 44.875 | 3.25 | 73.4375 |
| Compound B3 | 7.27 | 4.12 | 32.125 | 2.75 | 78.125 |
| Compound b3 | 8.82 | 9.41 | 76.625 | 5.25 | 82.8125 |
| Compound C3 | 6.42 | 2.16 | 42.5 | 4.75 | 89.625 |
| Compound c3 | 6.88 | 5.17 | 67.75 | 7.5 | 90.625 |

(1) 5 Weeks Aging at 105 F./40 F. Adhesion to Plywood (lbs per 1" Width)
(2) Elongation from Tensile Machine (2" × 1") Jaws Together/Length Before Break (Inches)
(3) Recovery/Recoil Test/4" × 1" Sample/Stretched to 12"/Timed for 2 minutes/Measured % of recovery to original size Table 10 illustrates various exemplary embodiments of the oil-enhanced polymer modified asphalt adhesive composition, in accordance with the present disclosure. Compositions a4-e4 illustrate examples of oil-enhanced polymer modified asphalt, as contemplated in the present disclosure. Specifically, compositions a4-e4 comprise polymer-modified asphalt, further modified with 1.0-4.0 weight % of a food grade peanut oil additive. Comparative asphalt compositions A4-E4 comprise polymer modified asphalt compositions that have been modified using petroleum oil, specifically Hydrolene SP 125 standard oil, rather than a peanut oil additive. The softening point, penetration, viscosity, adhesive level at a temperature of 40° F. before and after 5 weeks of aging, manual and machine elongation, tensile strength, and recovery of the various compositions are illustrated in Tables 11-12. The properties were measured as follows: softening point by ASTM D36 using the ring-and-ball apparatus immersed in distilled water of 30-80° C.; penetration by ASTM D5 run at 25° C. with a 100 gram weight; viscosity by ASTM D4402 run at 400° F. (204° C.) with a Brookfield Viscometer, using a no. 27 spindle, 12-30 RPM at 315° F.

TABLE 10

Peanut Oil-Enhanced Polymer Modified Asphalt Adhesives vs. Standard Oil.

| | Asphalt Flux | Peanut Oil | Hydrocarbon Oil | SBS Rubber | Filler |
|---|---|---|---|---|---|
| Compound A4 | 55% | 0 | 1% | 4% | 40% |
| Compound a4 | 55% | 1% | 0 | 4% | 40% |
| Compound B4 | 45% | 0 | 1% | 4% | 50% |
| Compound b4 | 45% | 1% | 0 | 4% | 50% |
| Compound C4 | 55% | 0 | 4% | 4% | 37% |
| Compound c4 | 55% | 4% | 0 | 4% | 37% |
| Compound D4 | 55% | 0 | 1% | 2% | 42% |
| Compound d4 | 55% | 1% | 0 | 2% | 42% |
| Compound E4 | 53% | 0 | 2% | 3% | 42% |
| Compound e4 | 53% | 2% | 0 | 3% | 42% |

TABLE 11

Properties for Peanut Oil-Enhanced Polymer Modified Asphalt Adhesives vs. Standard Oil.

| | Softening Point (F.) | Viscosity | Needle Pen |
|---|---|---|---|
| Compound A4 | 259 | 19500 | 53 |
| Compound a4 | 252 | 13708 | 73 |
| Compound B4 | 271 | 75500 | 51 |
| Compound b4 | 267 | 51500 | 52 |
| Compound C4 | 250 | 7617 | 83 |
| Compound c4 | 236 | 3183 | 91 |
| Compound D4 | 220 | 3150 | 51 |
| Compound d4 | 215 | 1517 | 76 |
| Compound E4 | 247 | 15292 | 53 |
| Compound e4 | 236 | 4550 | 70 |

TABLE 12

Properties for Peanut Oil-Enhanced Polymer Modified Asphalt Adhesives vs. Standard Oil. (Continued)

| | 40 F. Adhesion to Plywood (lbs per 1" width) | Adhesion to Plywood (lbs per 1" Width) After Aging (1) | Manual Elongation (6" × 1") Length Before Break/Inches | Elongation from Tensile Machine (Inches) (2) | Recovery/Recoil Test (3) |
|---|---|---|---|---|---|
| Compound A4 | 0 | 0.37 | 44.375 | 6.625 | 85.9375 |
| Compound a4 | 15.97 | — | 56.25 | 9.375 | 90.625 |
| Compound B4 | 0.1714 | 0 | 43.375 | 7.375 | 82.8125 |
| Compound b4 | 3.46 | — | 45.25 | 11.5 | 89.0625 |
| Compound C4 | 6.42 | 2.16 | 42.5 | 4.75 | 89.625 |
| Compound c4 | 7.76 | 9.12 | 63.875 | 8.25 | 96.875 |
| Compound D4 | 2.11 | 1.93 | 22 | 3 | 68.75 |
| Compound d4 | 3 | 3.71 | 13.5 | 4.375 | 73.4375 |
| Compound E4 | 3.15 | 0.046 | 31.5 | 3.125 | 76.5625 |
| Compound e4 | 3.55 | — | 58.5 | 6.5 | 89.0625 |

(1) 5 Weeks Aging at 105 F./40 F. Adhesion to Plywood (lbs per 1" Width)
(2) Elongation from Tensile Machine (2" × 1")Jaws Together/Length Before Break (Inches)
(3) Recovery/Recoil Test/4" × 1" Sample/Stretched to 12"/Timed for 2 minutes/Measured % of recovery to original size Table 13 illustrates various exemplary embodiments of the oil-enhanced polymer modified asphalt adhesive composition, in accordance with the present disclosure. Compositions a5-e5 illustrate examples of oil-enhanced polymer modified asphalt, as contemplated in the present disclosure. Specifically, compositions a5-e5 comprise polymer-modified asphalt, further modified with 1.0-4.0 weight % of a food grade corn oil additive. Comparative asphalt compositions A5-E5 comprise polymer modified asphalt compositions that have been modified using petroleum oil, specifically Hydrolene SP 125 standard oil, rather than a corn oil additive. The softening point, penetration, viscosity, adhesive level at a temperature of 40° F. before and after 5 weeks of aging, manual and machine elongation, tensile strength, and recovery of the various compositions are illustrated in Tables 14-15. The properties were measured as follows: softening point by ASTM D36 using the ring-and-ball apparatus immersed in distilled water of 30-80° C.; penetration by ASTM D5 run at 25° C. with a 100 gram weight; viscosity by ASTM D4402 run at 400° F. (204° C.) with a Brookfield Viscometer, using a no. 27 spindle, 12-30 RPM at 315° F.

TABLE 13

Corn Oil-Enhanced Polymer Modified Asphalt Adhesives vs. Standard Oil.

|  | Asphalt Flux | Corn Oil | Hydrocarbon Oil | SBS Rubber | Filler |
|---|---|---|---|---|---|
| Compound A5 | 45% | 0 | 1% | 4% | 50% |
| Compound a5 | 45% | 1% | 0 | 4% | 50% |
| Compound B5 | 55% | 0 | 4% | 2% | 39% |
| Compound b5 | 55% | 4% | 0 | 2% | 39% |
| Compound C5 | 55% | 0 | 4% | 4% | 37% |
| Compound c5 | 55% | 4% | 0 | 4% | 37% |
| Compound D5 | 55% | 0 | 1% | 2% | 42% |
| Compound d5 | 55% | 1% | 0 | 2% | 42% |
| Compound E5 | 53% | 0 | 2% | 3% | 42% |
| Compound e5 | 53% | 2% | 0 | 3% | 42% |

TABLE 14

Properties for Corn Oil-Enhanced Polymer Modified Asphalt Adhesives vs. Standard Oil.

|  | Softening Point (F.) | Viscosity | Needle Pen | Recovery/Recoil Test (3) |
|---|---|---|---|---|
| Compound A5 | 271 | 75500 | 51 | 82.8125 |
| Compound a5 | 277 | 77000 | 50 | 87.5 |
| Compound B5 | 211 | 1217 | 114 | 78.125 |
| Compound b5 | 204 | 800 | 141 | 82.8125 |
| Compound C5 | 250 | 7617 | 83 | 89.625 |
| Compound c5 | 239 | 3396 | 98 | 98.4375 |
| Compound D5 | 220 | 3150 | 51 | 68.75 |
| Compound d5 | 213 | 2592 | 67 | 78.125 |
| Compound E5 | 247 | 15292 | 53 | 76.5625 |
| Compound e5 | 222 | 2558 | 70 | 81.25 |

TABLE 15

Properties for Corn Oil-Enhanced Polymer Modified Asphalt Adhesives vs. Standard Oil. (Continued)

|  | 40 F. Adhesion to Plywood (lbs per 1" width) | Adhesion to Plywood (lbs per 1" Width) After Aging (1) | Manual Elongation (6" × 1") Length Before Break/Inches | Tensile (2" × 1") Jaws Together (LBS) | Elongation from Tensile Machine (Inches) (2) |
|---|---|---|---|---|---|
| Compound A5 | 0.1714 | 0 | 43.375 | 9 | 7.375 |
| Compound a5 | 3.84 | — | 44 | 18 | 9.75 |
| Compound B5 | 8.44 | 5.08 | 53.625 | 11 | 2.25 |
| Compound b5 | 18.53 | 6.32 | 67.5 | 10 | 4.5 |
| Compound C5 | 6.42 | 2.16 | 42.5 | 6 | 4.75 |
| Compound c5 | 11.1 | 6.31 | 60.375 | 6 | 5.25 |
| Compound D5 | 2.11 | 1.93 | 22 | 11 | 3 |
| Compound d5 | 9.6 | 6.94 | 69.75 | 13.5 | 8 |
| Compound E5 | 3.15 | 0.046 | 31.5 | 9 | 3.125 |
| Compound e5 | 7.59 | — | 51.125 | 10 | 6.375 |

(1) 5 Weeks Aging at 105 F./40 F. Adhesion to Plywood (lbs per 1" Width)
(2) Elongation from Tensile Machine (2" × 1")Jaws Together/Length Before Break (Inches)
(3) Recovery/Recoil Test/4" × 1" Sample/Stretched to 12"/Timed for 2 minutes/Measured % of recovery to original size Table 16 illustrates various exemplary embodiments of the oil-enhanced polymer modified asphalt adhesive composition, in accordance with the present disclosure. Compositions a6-b6 illustrate examples of oil-enhanced polymer modified asphalt, as contemplated in the present disclosure. Specifically, compositions a6-b6 comprise polymer-modified asphalt, further modified with 1.0-4.0 weight % of a food grade canola oil additive. Comparative asphalt compositions A6-B6 comprise polymer modified asphalt compositions that have been modified using petroleum oil, specifically Hydrolene SP 125 standard oil, rather than a canola oil additive. The softening point, penetration, viscosity, adhesive level at a temperature of 40° F. before and after 5 weeks of aging, manual and machine elongation, tensile strength, and recovery of the various compositions are illustrated in Tables 17-18. The properties were measured as follows: softening point by ASTM D36 using the ring-and-ball apparatus immersed in distilled water of 30-80° C.; penetration by ASTM D5 run at 25° C. with a 100 gram weight; viscosity by ASTM D4402 run at 400° F. (204° C.) with a Brookfield Viscometer, using a no. 27 spindle, 12-30 RPM at 315° F.

TABLE 16

Canola Oil-Enhanced Polymer Modified Asphalt Adhesives vs. Standard Oil.

|  | Asphalt Flux | Canola Oil | Hydrocarbon Oil | SBS Rubber | Filler |
|---|---|---|---|---|---|
| Compound A6 | 55% | 0 | 4% | 4% | 37% |
| Compound a6 | 55% | 4% | 0 | 4% | 37% |
| Compound B6 | 53% | 0 | 2% | 3% | 42% |
| Compound b6 | 53% | 2% | 0 | 3% | 42% |

TABLE 17

Properties for Canola Oil-Enhanced Polymer Modified Asphalt Adhesives vs. Standard Oil.

|  | Softening Point (F.) | Viscosity | Needle Pen | Recovery/Recoil Test (3) |
|---|---|---|---|---|
| Compound A6 | 244 | 6292 | 81 | 93.75 |
| Compound a6 | 245 | 4808 | 85 | 96.875 |

TABLE 17-continued

Properties for Canola Oil-Enhanced Polymer Modified Asphalt Adhesives vs. Standard Oil.

|  | Softening Point (F.) | Viscosity | Needle Pen | Recovery/Recoil Test (3) |
|---|---|---|---|---|
| Compound B6 | 247 | 15292 | 53 | 76.5625 |
| Compound b6 | 234 | 3208 | 84 | 90.625 |

TABLE 18

Properties for Canola Oil-Enhanced Polymer Modified Asphalt Adhesives vs. Standard Oil. (Continued)

| | 40 F. Adhesion to Plywood (lbs per 1" width) | Adhesion to Plywood (lbs per 1" Width) After Aging (1) | Tensile (2" × 1") Jaws Together (LBS) | Elongation from Tensile Machine (Inches) (2) |
|---|---|---|---|---|
| Compound A6 | 5.23 | 5.24 | 10 | 4.375 |
| Compound a6 | 6.53 | 9.6 | 11.5 | 5.5 |
| Compound B6 | 3.15 | 0.046 | 9 | 3.125 |
| Compound b6 | 6.7 | 8.05 | 11.5 | 4.25 |

(1) 5 Weeks Aging at 105 F./40 F. Adhesion to Plywood (lbs per 1" Width)
(2) Elongation from Tensile Machine (2" × 1")Jaws Together/Length Before Break (Inches)
(3) Recovery/Recoil Test/4" × 1" Sample/Stretched to 12"/Timed for 2 minutes/Measured % of recovery to original size Table 19 illustrates various exemplary embodiments of the oil-enhanced polymer modified asphalt adhesive composition, in accordance with the present disclosure. Compositions a7-f7 illustrate examples of oil-enhanced polymer modified asphalt, as contemplated in the present disclosure. Specifically, compositions a7-f7 comprise polymer-modified asphalt, further modified with 1.0-4.0 weight % of a food grade blended oil additive. Comparative asphalt compositions A7-F7 comprise polymer modified asphalt compositions that have been modified using petroleum oil, specifically Hydrolene SP 125 standard oil, rather than a corn oil. The softening point, penetration, viscosity, adhesive level at a temperature of 40° F. before and after 5 weeks of aging, manual and machine elongation, tensile strength, and recovery of the various compositions are illustrated in Tables 20-21. The properties were measured as follows: softening point by ASTM D36 using the ring-and-ball apparatus immersed in distilled water of 30-80° C.; penetration by ASTM D5 run at 25° C. with a 100 gram weight; viscosity by ASTM D4402 run at 400° F. (204° C.) with a Brookfield Viscometer, using a no. 27 spindle, 12-30 RPM at 315° F.

TABLE 19

Properties for Blended Oil-Enhanced Polymer Modified Asphalt Adhesives vs. Standard Oil.

| | Asphalt Flux | Blended Oil | Hydrocarbon Oil | SBS Rubber | Filler |
|---|---|---|---|---|---|
| Compound A7 | 55% | 0 | 1% | 2% | 42% |
| Compound a7 | 55% | 1% | 0 | 2% | 42% |
| Compound B7 | 55% | 0 | 4% | 4% | 37% |
| Compound b7 | 55% | 4% | 0 | 4% | 37% |
| Compound C7 | 44% | 0 | 4% | 2% | 50% |
| Compound c7 | 44% | 4% | 0 | 2% | 50% |
| Compound D7 | 44% | 0 | 4% | 2% | 50% |
| Compound d7 | 44% | 4% | 0 | 2% | 50% |
| Compound E7 | 55% | 0 | 1% | 4% | 40% |
| Compound e7 | 55% | 1% | 0 | 4% | 40% |
| Compound F7 | 53% | 0 | 2% | 3% | 42% |
| Compound f7 | 53% | 2% | 0 | 3% | 42% |

TABLE 20

Properties for Blended Oil-Enhanced Polymer Modified Asphalt Adhesives vs. Standard Oil.

| | Softening Point (F.) | Viscosity | Needle Pen |
|---|---|---|---|
| Compound A7 | 214 | 2067 | 69 |
| Compound a7 | 214 | 1817 | 74 |
| Compound B7 | 244 | 6292 | 81 |

TABLE 20-continued

Properties for Blended Oil-Enhanced Polymer Modified Asphalt Adhesives vs. Standard Oil.

| | Softening Point (F.) | Viscosity | Needle Pen |
|---|---|---|---|
| Compound b7 | 242 | 3200 | 91 |
| Compound C7 | 230 | 3825 | 78 |
| Compound c7 | 220 | 2667 | 100 |
| Compound D7 | 232 | 4050 | 77 |
| Compound d7 | 227 | 2708 | 88 |
| Compound E7 | 259 | 19500 | 53 |
| Compound e7 | 242 | 20562 | 47 |
| Compound F7 | 247 | 15292 | 53 |
| Compound f7 | 241 | 4042 | 80 |

TABLE 21

Properties for Blended Oil-Enhanced Polymer Modified Asphalt Adhesives vs. Standard Oil. (Continued)

| | 40 F. Adhesion to Plywood (lbs per 1" width) | Adhesion to Plywood (lbs per 1" Width) After Aging (1) | Elongation from Tensile Machine (inches) (2) | Recovery/ Recoil Test (3) |
|---|---|---|---|---|
| Compound A7 | 1.08 | 0.574 | 2.625 | 71.875 |
| Compound a7 | 4.11 | 6.3 | 4 | 75.00 |
| Compound B7 | 5.23 | 5.24 | 4.375 | 93.75 |
| Compound b7 | 8.65 | 7.76 | 6.5 | 93.75 |
| Compound C7 | 7.27 | 4.12 | 2.75 | 78.125 |
| Compound c7 | 7.35 | 10 | 2.875 | 81.25 |
| Compound D7 | 8.17 | 4.75 | 2.75 | 78.125 |
| Compound d7 | 8.25 | 8.07 | 6 | 79.6875 |
| Compound E7 | 0 | 0.37 | 6.625 | 85.9375 |
| Compound e7 | 0.99 | 1.36 | 9.5 | 82.8125 |
| Compound F7 | 3.15 | 0.046 | 3.125 | 76.5625 |
| Compound f7 | 9.44 | 7.79 | 5.875 | 93.375 |

(1) 5 Weeks Aging at 105 F./40 F. Adhesion to Plywood (lbs per 1" Width)
(2) Elongation from Tensile Machine (2" × 1")Jaws Together/Length Before Break (Inches)
(3) Recovery/Recoil Test/4" × 1" Sample/Stretched to 12"/Timed for 2 minutes/Measured % of recovery to original size Although the present invention has been described with reference to particular means, materials and embodiments, from the foregoing description, one skilled in the art can easily ascertain the essential characteristics of the present disclosure and various changes and modifications can be made to adapt the various uses and characteristics without departing from the spirit and scope of the present invention as described above and set forth in the attached claims.

The invention claimed is:

1. An oil-enhanced polymer modified asphalt adhesive composition comprising:

an asphalt flux;

about 25 to about 60 percent by weight of at least one filler material, comprising one or more of ground limestone, dolomite, sand, and calcium carbonate;

about 1 to about 10 percent by weight of a polymer modifier; and 1.0 to 8.0 percent by weight of an oil or oil derivative additive, wherein the oil comprises one or more of vegetable oils, nut oils, and seed oils, and wherein the oil-enhanced polymer modified adhesive composition has a penetration of from about 50 to about 150 pen units at 25° C. with a 100 gram weight and a softening point from about 155° F. to about 282° F.

2. The oil-enhanced polymer modified asphalt adhesive composition of claim 1, wherein the polymer modifier comprises an elastomeric copolymer.

3. The oil-enhanced polymer modified asphalt adhesive composition of claim 1, wherein the polymer modifier is a rubber modified asphalt.

4. The oil-enhanced polymer modified asphalt adhesive composition of claim 2, wherein the elastomeric copolymer is a linear or radial block copolymer.

5. The oil-enhanced polymer modified asphalt adhesive composition of claim 2, wherein the elastomeric copolymer is a thermoplastic.

6. The oil-enhanced polymer modified asphalt adhesive composition of claim 1, wherein the oil or oil derivative additive comprises 1.0-4.0 weight percent based on the total weight of the oil-enhanced polymer modified asphalt adhesive composition.

7. The oil-enhanced polymer modified asphalt adhesive composition of claim 1, wherein the oil is one or more of soy oil, canola oil, corn oil, peanut oil, sunflower oil, olive oil, safflower oil, rapeseed oil, and mixtures thereof.

8. The oil-enhanced polymer modified asphalt adhesive composition of claim 1, wherein the oil has been modified by hydrogenation.

9. The oil-enhanced polymer modified asphalt adhesive composition of claim 1, wherein the adhesive is a self-adhering membrane adhesive.

10. The oil-enhanced polymer modified asphalt adhesive composition of claim 1, wherein the adhesive composition has an elongation to break of at least 10%.

11. The oil-enhanced polymer modified asphalt adhesive composition of claim 1, wherein the adhesive composition has an adhesive level at a temperature of 40° F. of at least 3 lbs/1" width.

12. The oil-enhanced polymer modified asphalt adhesive composition of claim 1, wherein the adhesive composition has a softening point of at least 170° F.

13. The oil-enhanced polymer modified asphalt adhesive composition of claim 1, wherein the adhesive composition has a penetration of 50 to 100.

14. The oil-enhanced polymer modified asphalt adhesive composition of claim 1, wherein the at least one filler comprises at least one of ground limestone or calcium carbonate.

15. A membrane material comprising:
a carrier; and
an oil-enhanced polymer modified asphalt adhesive composition comprising:
an asphalt flux;
about 1.0 to about 10.0 wt. % of an elastomeric copolymer;
about 25 to about 60 percent by weight of at least one filler material, comprising one or more of ground limestone, dolomite, sand, and calcium carbonate; and
1.0 to about 8.0 wt. % of an oil or oil derivative additive, wherein the oil comprises one or more of vegetable oils, nut oils, and seed oils, and wherein the oil-enhanced polymer modified adhesive composition has a penetration of from about 50 to about 150 pen units at 25° C. with a 100 gram weight and a softening point from about 155° F. to about 282° F.

16. The membrane material of claim 15, wherein the elastomeric copolymer is rubber.

17. The membrane material of claim 16, wherein the elastomeric copolymer comprises at least one of styrene-butadiene-styrene and thermoplastic polyolefin.

18. The membrane material of claim 15, wherein the oil or oil derivative additive comprises 1.0 to about 4.0 weight percent based on the total weight of the oil-enhanced polymer modified asphalt adhesive composition.

19. The membrane material of claim 15, wherein the oil is one or more of soy oil, canola oil, corn oil, peanut oil, sunflower oil, olive oil, safflower oil, rapeseed oil, and mixtures thereof.

20. The membrane material of claim 15, wherein the adhesive composition has an elongation to break of at least 10%.

21. The membrane material of claim 15, wherein the adhesive composition has an adhesive level at a temperature of 40° F. of at least 3 lbs/1" width.

22. The membrane material of claim 15, wherein the adhesive composition has a softening point of at least 170° F.

23. The membrane material of claim 15, wherein the adhesive composition has a penetration of 50 to 100.

24. The membrane material of claim 15, wherein the carrier has been impregnated with the adhesive.

25. A roofing membrane comprising:
a plurality of layers, wherein the layers comprise
a granular layer;
a first adhesive layer; and
a reinforcing layer, wherein the first adhesive layer comprises an oil-enhanced polymer modified asphalt adhesive composition comprising,
an asphalt flux;
about 25 to about 60 percent by weight of at least one filler material, comprising one or more of ground limestone, dolomite, sand, and calcium carbonate;
about 1 to about 10 percent by weight of a polymer modifier; and
1.0 to 8.0 percent by weight of an oil or oil derivative additive, wherein the oil comprises one or more of vegetable oils, nut oils, and seed oils, wherein the adhesive composition has an adhesive level at a temperature of 40° F. of at least 3 lbs/1" width, a penetration of from about 50 to about 150 pen units at 25° C. with a 100 gram weight, and a softening point from about 155° F. to about 282° F.

26. The roofing membrane of claim 25, wherein the polymer modifier is a rubber modified asphalt comprising at least one of styrene-butadiene-styrene and thermoplastic polyolefin.

27. The roofing membrane of claim 25, wherein the oil or oil derivative additive comprises about 2.0-4.0 weight percent based on the total weight of the oil-enhanced polymer modified asphalt adhesive composition.

28. The roofing membrane of claim 25, further comprising a second adhesive layer, comprising:
a polymer modified asphalt, wherein the polymer modified asphalt comprises an elastomeric copolymer; and
an oil or oil derivative, wherein the oil comprises one or more of vegetable oils, nut oils, and seed oils.

* * * * *